(No Model.)
A. DUNBAR.
APPARATUS FOR TRUSSING, CHIMING, AND CROZING CASKS OR BARRELS.
No. 599,057. Patented Feb. 15, 1898.
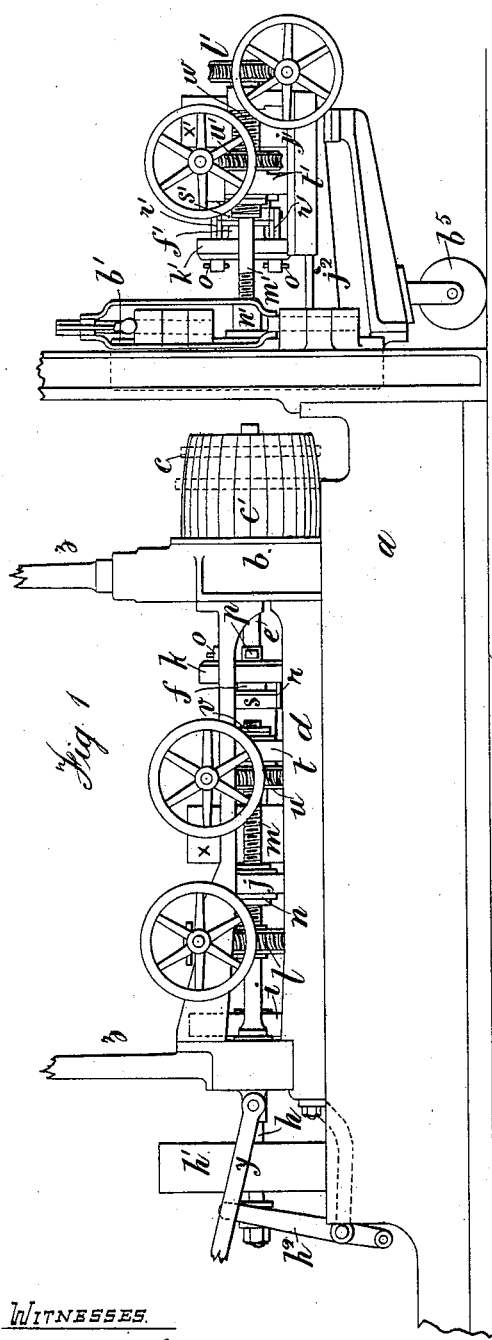
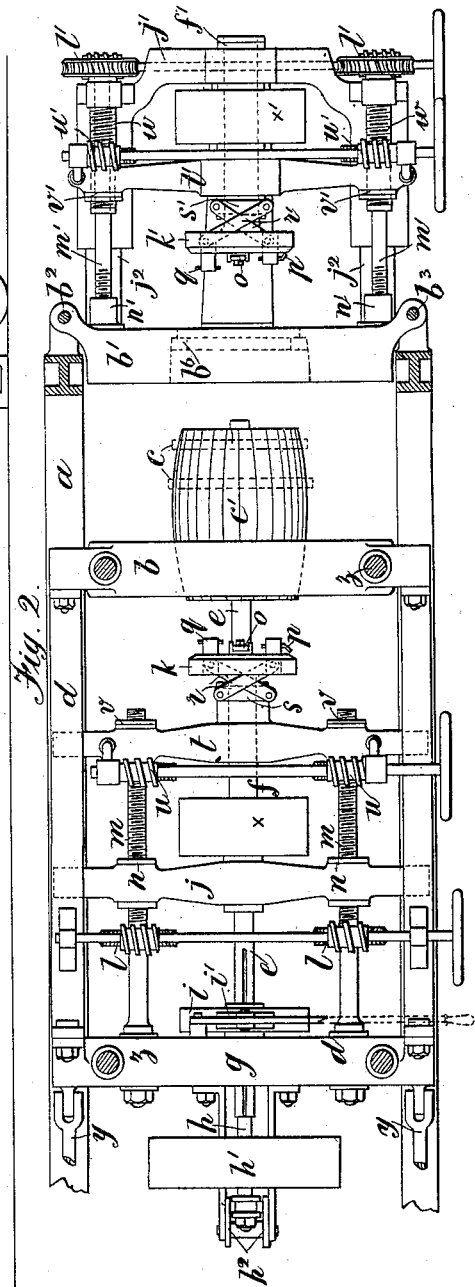
WITNESSES.
N. B. Johnson
J. Richman
INVENTOR.
Alexander Dunbar

UNITED STATES PATENT OFFICE.

ALEXANDER DUNBAR, OF LIVERPOOL, ENGLAND.

APPARATUS FOR TRUSSING, CHIMING, AND CROZING CASKS OR BARRELS.

SPECIFICATION forming part of Letters Patent No. 599,057, dated February 15, 1898.

Application filed June 30, 1896. Serial No. 597,512. (No model.) Patented in England March 8, 1893, No. 4,999; in Spain February 5, 1894, No. 15,487; in France February 8, 1894, No. 236,129; in Belgium February 10, 1894, No. 108,661; in Italy February 19, 1894, No. 35,785; in Austria July 13, 1894, No. 3,198; in Hungary November 7, 1895, No. 4,517, and in Portugal January 20, 1896, No. 2,067.

*To all whom it may concern:*

Be it known that I, ALEXANDER DUNBAR, a subject of the Queen of Great Britain, residing at Liverpool, in the county of Lancaster, England, have invented new and useful Improvements in Apparatus for Trussing, Chiming, and Crozing Casks or Barrels, (for which I have obtained patents in Great Britain, No. 4,999, bearing date March 8, 1893; in France, No. 236,129, bearing date February 8, 1894; in Belgium, No. 108,661, bearing date February 10, 1894; in Austria, No. 3,198, bearing date July 13, 1894; in Hungary, No. 4,517, bearing date November 7, 1895; in Spain, No. 15,487, bearing date February 5, 1894; in Portugal, No. 2,067, bearing date January 20, 1896, and in Italy, No. 35,785, bearing date February 19, 1894,) of which the following is a specification.

The object of this invention is to provide machinery that will more rapidly and accurately truss, chime, and croze staves to form a cask than has been possible hitherto. In carrying this object into effect I make use of trussing heads or rings, one being movable toward and from the other, a collapsible drum for holding the form of staves, and movable tools for chiming and crozing the ends of the staves, all substantially as hereinafter described.

In the drawings, Figure 1 is a side elevation, and Fig. 2 a plan, of part of a trussing, chiming, and crozing machine, showing the essential features of my invention.

$a$ is the main frame.

$b\,b'$ are trussing-heads of any suitable form for forcing the trussing-rings onto the form of staves, as shown at $c$. The trussing-head $b'$ is pivoted at one side to the main frame at $b^2$ and is detachably secured at the other side by pins and lugs $b^3$.

$b^6$ is a leveling ring or plate placed in or in front of the trussing-head $b'$ for leveling the ends of the staves.

The trussing-head $b$ is secured to the frame $d$, which is free to slide to and fro on the main frame $a$.

$c'$ is a form of staves carried on a collapsible drum of any usual kind supported by a shaft $e$, which passes through the hollow shaft $f$ and is free to revolve therein and also through bearings at $g$ in the sliding frame $d$.

$h$ is a shaft passing through the shaft $e$ for operating the mechanism of the collapsible drum.

$i$ is a brake-wheel, secured to the shaft $e$ in such manner that the shaft may move endwise through such brake-wheel, and $i'$ is a brake to hold the wheel $i$ and shaft $e$ from revolving.

$h'$ is a pulley, through which revolving motion is given to the shaft $h$.

The shafts $e$ and $h$ are free to be moved longitudinally by means of the lever $h^2$, so as to move the form of staves $c'$ clear of the trussing-heads.

$f\,f'$ are shafts carried in bearings in the frames $j\,j'$ and having secured thereto cutter-heads $k\,k'$. The frame $j$ is free to slide in guides in the frame $d$ and has motion imparted to it by means of worm-gear $l$, operating the screws $m$, which engage with nuts $n$ in the said frame $j$. The frame $j'$ slides in guides $j^2$, attached to the trussing-head $b'$, and has motion imparted to it by means of worm-gear $l'$, operating the screws $m'$, which engage with nuts $n'$, attached to the trussing-head $b'$ or to the guides $j^2$.

The cutter-heads $k\,k'$ are provided with cutting-tools $o\,o'$, $p\,p'$, and $q\,q'$. The tools $o\,o'$ are adjustable by means of set-screws. The tools $p\,p'$ and $q\,q'$ are carried in slides in the cutter-heads and are movable by means of links $r\,r'$, connected to the slides and to rotatable collars $s\,s'$ on the frames or blocks $t\,t'$. The frames $t\,t'$ and collars $s\,s'$ are caused to move toward and from the cutting-heads, so as to give motion to the tool-carrying slides, by means of worm-gear $u\,u'$, operating nuts $v\,v'$ on the frames $t\,t'$ and engaging with screws $m\,w$.

$x\,x'$ are pulleys for giving rotary motion to the shafts $f\,f'$, cutter-heads $k\,k'$, and cutting-tools.

$y$ are connecting-rods for giving motion to the sliding frames $d$ and are connected to cranks operated, preferably, by worm and wheel gear of any usual kind.

Motion is transmitted to the pulleys $h'$ and $x$ by belts from overhead traveling gear of any well-known kind supported on pillars $z$, attached to the frame $d$.

The operation of the apparatus is as follows: The pins $b^3$ are freed from their corresponding lugs by means of the lever and links $b^4$. The trussing-head $b'$ is swung outward, carrying with it the guides $j^2$, frames $j'$ and $t'$, and all the gearing and tools connected therewith, the whole being partly supported by the roller $b^5$. A form of staves $c'$ is then placed over the collapsible drum, which is then expanded by means of the pulley $h'$ and shaft $h$, the shaft $e$ being held stationary by the brake $i'$. The trussing-head $b'$ and connections are swung inward and secured by the pins and lugs $b^3$, with the leveling-ring $b^6$ in position. The sliding frame $d$ is now caused to move toward the trussing-head $b'$, carrying with it the trussing-head $b$, form of staves on the collapsible drum, cutter-head $k$, frame $j$, shaft $f$, and all the gearing connected therewith. When the trussing-head $b$ has approached the trussing-head $b'$, so that the end of the form of staves has been brought up against the leveling-ring $b^6$ and thereby leveled, the opposite end of the form of staves being at the same time partly trussed, the trussing-head $b$ is slightly withdrawn, the leveling-ring $b^6$ is removed, and the trussing-head $b$ again caused to approach the head $b'$. When the head $b$ has approached the head $b'$, so that the form of staves has been firmly trussed, the gear operating the connecting-rods $y$ is put out of action, and the sliding frame $d$ and trussing-head $b$ are brought to rest, and the form of staves is firmly held in position. The shafts $f f'$ are now set in motion, and the cutter-heads $k k'$ are caused to advance toward each end of the form of staves by means of the worm-gear $l l'$, as above described. When the cutter-heads have reached the desired position, which is when the tools $o o'$ have partially cut the chime, the slides carrying the cutting-tools $p p' q q$ are caused to move outward by means of the worm-gear $u u'$, as above described, so as to complete the chiming and hollowing and form the croze. The tools $p p'$ finish the chiming, and the tools $q q'$ cut the croze. The tools are now retracted, the shafts $f f'$ are brought to rest, the cutter-heads are withdrawn from the form of staves, the gear operating the connecting-rods is set in motion, and the sliding frame $d$ and its connections and the trussing-head $b$ recede from the trussing-head $b'$. The form of staves is now moved clear of the trussing-heads by means of the lever $h^2$ and the shafts $h'$ and $e$, the trussing-head $b'$ is again swung outward, the drum is collapsed, and the form of staves, trussed, chimed, hollowed, and crozed, is removed. The form of staves may be moved clear of the trussing-head automatically, if desired, by causing the end of the shaft $h'$ to strike against a projection on the main frame.

The length of the connecting-rods $y$ is so adjusted that when the trussing-head $b$ has approached sufficiently close to the trussing-head $b'$ the sliding frame $d$ is at the end of its travel, and any further motion of the cranks operating the connecting-rods will cause the trussing-head $b$ to recede, thus avoiding any excessive pressure on the form of staves $c'$.

I claim—

1. The combination with a swinging trussing-head, of a sliding frame carrying a second trussing-head, and a collapsible drum supported from and movable with said frame.

2. The combination with a swinging trussing-head, of a sliding frame carrying a second trussing-head, a longitudinally-movable rotatory shaft supported in bearings upon the frame, and a collapsible drum carried by said shaft.

3. The combination with a sliding frame carrying a trussing-head, of a hollow shaft on the frame carrying a cutter-head, and a shaft passing through said hollow shaft and carrying a collapsible drum.

4. The combination with a sliding frame carrying a trussing-head, of a longitudinally-movable hollow shaft carrying a cutter-head, and an inner longitudinally-movable shaft extending through said hollow shaft and carrying a collapsible drum.

5. The combination with a movable frame carrying a trussing-head, of a hollow shaft slidably arranged thereon and carrying a cutter-head having sliding cutters therein, means for moving said cutters, and a shaft passing through said hollow shaft and carrying a collapsible drum.

In testimony whereof I have hereunto set my hand this 19th day of June, 1896.

ALEXANDER DUNBAR.

Witnesses:
W. B. JOHNSON,
I. RICHMAN.